United States Patent
Lin et al.

(10) Patent No.: US 8,908,130 B2
(45) Date of Patent: Dec. 9, 2014

(54) OPTICAL ELEMENTS, BACKLIGHT MODULES, AND LIQUID CRYSTAL DISPLAY EMPLOYING THE SAME

(75) Inventors: Ying-Jui Lin, Kaohsiung (TW); Hui-Lung Kuo, Taipei (TW); Pin-Chen Chen, Taipei (TW); Pao-Ju Hsieh, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 625 days.

(21) Appl. No.: 12/610,982

(22) Filed: Nov. 2, 2009

(65) Prior Publication Data

US 2010/0110336 A1    May 6, 2010

(30) Foreign Application Priority Data

Nov. 6, 2008 (TW) .............................. 97142818 A
Sep. 14, 2009 (TW) .............................. 98130909 A (51) Int. Cl.
*G02F 1/1335* (2006.01)
*C09K 19/02* (2006.01)

(52) U.S. Cl.
CPC ................................ *G02F 1/133606* (2013.01)
USPC .............................. 349/115; 349/64; 349/185

(58) Field of Classification Search
USPC ....................................... 349/64, 115, 185, 98
See application file for complete search history.

(56) References Cited

U.S. PATENT DOCUMENTS

| | | | |
|---|---|---|---|
| 5,867,316 A | 2/1999 | Carlson et al. | |
| 6,088,079 A | 7/2000 | Kameyama et al. | |
| 6,222,677 B1 | 4/2001 | Budd et al. | |
| 6,268,961 B1 * | 7/2001 | Nevitt et al. | 359/485.03 |
| 6,381,068 B1 | 4/2002 | Harada et al. | |
| 6,669,999 B2 | 12/2003 | Hsieh et al. | |
| 6,721,030 B2 | 4/2004 | Hsieh et al. | |
| 6,809,782 B1 | 10/2004 | Kawamoto et al. | |
| 6,879,356 B2 | 4/2005 | Hsieh et al. | |
| 7,220,036 B2 | 5/2007 | Yi et al. | |
| 7,322,731 B2 * | 1/2008 | Epstein et al. | 362/609 |
| 8,111,352 B2 * | 2/2012 | Stalder et al. | 349/64 |
| 2003/0164906 A1 * | 9/2003 | Arakawa et al. | 349/96 |
| 2004/0189908 A1 * | 9/2004 | Kawamoto et al. | 349/117 |
| 2004/0239834 A1 * | 12/2004 | Park et al. | 349/96 |
| 2006/0204681 A1 * | 9/2006 | Kim et al. | 428/1.31 |
| 2006/0291055 A1 * | 12/2006 | Gehlsen et al. | 359/486 |
| 2007/0236628 A1 * | 10/2007 | Epstein | 349/67 |
| 2008/0002256 A1 * | 1/2008 | Sasagawa et al. | 359/485 |

FOREIGN PATENT DOCUMENTS

| | | |
|---|---|---|
| CN | 1707330 | 12/2005 |
| CN | 1989429 A | 6/2007 |
| CN | 101146892 | 3/2008 |
| TW | 200811528 | 3/2008 |
| WO | WO 01/22129 A1 | 3/2001 |

OTHER PUBLICATIONS

China Patent Office, Office Action, Application Patent Serial No. 200910262038.5, Nov. 9, 2011, China.
Taiwan Patent Office, Office Action, Patent Application Serial No. 098130909, Feb. 26, 2013, Taiwan.

\* cited by examiner

*Primary Examiner* — Dennis Y Kim (57) ABSTRACT

Optical elements and backlight modules employing the same are provided. The optical element can be a brightness enhancement diffusion complex film, comprising a cholesteric liquid crystal film and a transparent optical film directly disposed on the cholesteric liquid crystal film. Particularly, the whole transparent optical film directly contacts to the cholesteric liquid crystal film, in the absence of an intermediate located between the transparent optical film and the cholesteric liquid crystal film.

6 Claims, 6 Drawing Sheets

OPTICAL ELEMENTS, BACKLIGHT MODULES, AND LIQUID CRYSTAL DISPLAY EMPLOYING THE SAME

CROSS REFERENCE TO RELATED APPLICATIONS

This application is based upon and claims the benefit of priority from the prior Taiwan Patent Application No. 97142818, filed on Nov. 6, 2008 and the prior Taiwan Patent Application No. 98130909, filed on Sep. 14, 2009, the entire contents of which are incorporated herein by reference.

BACKGROUND OF THE INVENTION

1. Field of the Invention

The invention relates to an optical element, and more particularly to an optical element achieving the requirements of light polarization, light integration, and brightness uniformity.

2. Description of the Related Art

Due to the advantages of compactness, light weight, and low power consumption, liquid crystal displays (LCD) have become widely used in electronic product applications, such as monitors, notebook computers, digital cameras, projectors, and mobile phones.

A backlight module is one of the key components of an LCD. Since the LCD panel does not generate light itself, the backlight module is responsible for providing sufficient light and uniform luminance for the LCD panel. Presently, LCDs are broadly used in several electronic products, such as monitors, notebooks, and large-size LCD-TVs. Consequently, the demand for backlight units and related components is growing.

Figure 1:
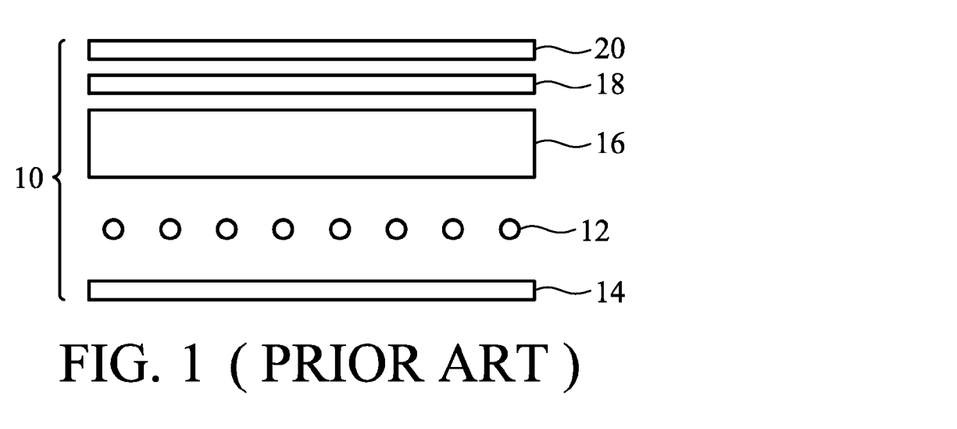
FIG. 1 shows a cross-section view of a backlight module employed in the conventional liquid crystal display.

FIG. 1 is a cross-section view of a conventional backlight module 10 including a light source 12, reflector 14, diffusion plate 16, diffusion sheet 18, and a prism sheet 20, assembled and joined together. As illustrated, it is difficult to further improve the brightness, light weight, and thin characteristics of the conventional backlight module 10.

Thus, a backlight module with a combined diffusion plate and brightness enhancement film has been developed. The backlight module enhances the brightness by integrated optical and polarized light effect. However, the brightness enhancement film increases costs and complicates fabrication of the LCD.

Figure 2:
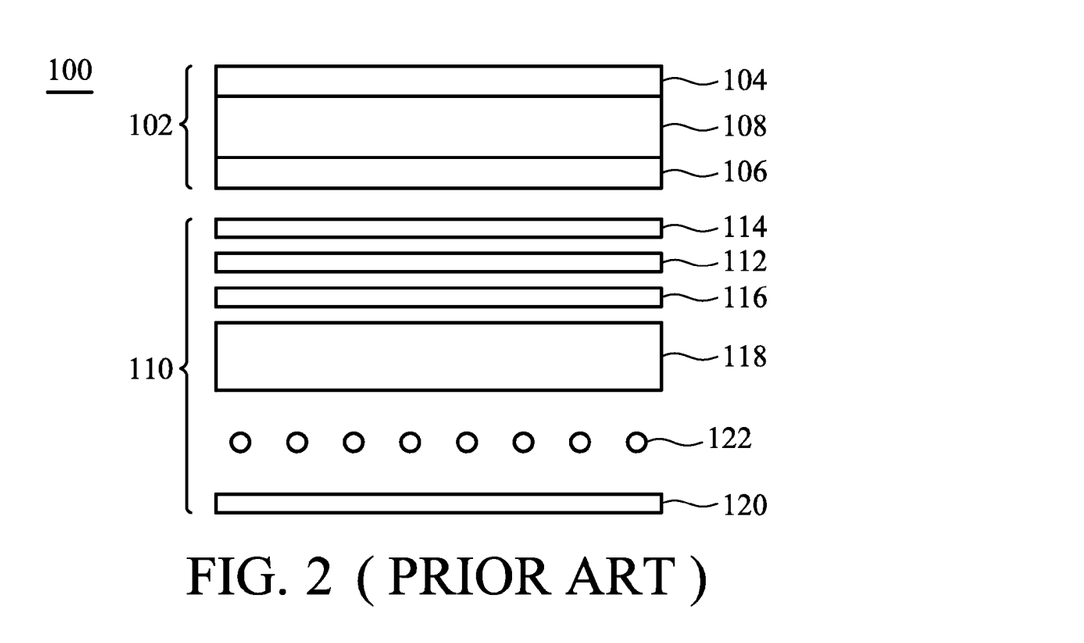
FIG. 2 shows a cross-section view of a backlight module employed in another conventional liquid crystal display.

As such, U.S. Pat. No. 7,220,036 discloses a liquid crystal display 100 including a liquid crystal display panel 102 and a backlight module 110, as shown in FIG. 2. The liquid crystal display panel 102 includes a top substrate 104, a bottom substrate 106, and a liquid crystal layer 108, and the backlight module 110 includes a brightness enhancement film 114 on a prism sheet 112, a bottom diffusion sheet 116, diffusion plate 118, reflector 120 and a light source 122. Thus, illumination of the liquid crystal display 100 is enhanced, diffused, and integrated. However, since the backlight module 110 is assembled from a plurality of laminations, fabrication of the LCD is complicated and yield of the backlight module 110 is decreased. Further, disadvantages concerning transfer problems, superimposed traces, and structural damage caused during assembly significantly limit practical applications of the backlight module 110 in the LCD industry. Specifically, the brightness enhancement film 114 is a complex film made by coextrusion of a multitude (one thousand or more) of alternating polymer layers with distinct reflective indexes in an optical axis. Moreover, due to optical characteristics of the LCD, the backlight module 110 is combined with the prism sheet and the bottom diffusion sheet, thus increasing weight and thickness of the backlight module 110, which is contrary to present trends.

Therefore, a novel, light, thin, low powered, and bright backlight module, fabricated at low cost and applicable to large-sized application is desirable.

BRIEF SUMMARY OF THE INVENTION

An exemplary embodiment of an optical element comprises a brightness enhancement diffusion complex film. The brightness enhancement diffusion complex film comprises a cholesteric liquid crystal film and a transparent optical film. The whole transparent optical film and the whole cholesteric liquid crystal film directly adhered to each other, in the absence of an intermediate located between the transparent optical film and the cholesteric liquid crystal film. The transparent optical film can comprise: a transparent particle with a weight percentage of 5-40 wt %, and a resin with a weight percentage of 60-95 wt %, based on the weight of the transparent optical film.

An exemplary embodiment of a backlight module comprises a light source, a brightness enhancement diffusion complex film, and a polarizing sheet, wherein, the brightness enhancement diffusion complex film comprises a cholesteric liquid crystal film, and a transparent optical film. The whole transparent optical film and the whole cholesteric liquid crystal film directly adhered to each other, in the absence of an intermediate located between the transparent optical film and the cholesteric liquid crystal film. The transparent optical film comprises: a transparent particle with a weight percentage of 5-40 wt %, and a resin with a weight percentage of 60-95 wt %, based on the weight of the transparent optical film.

The invention also provides a liquid crystal display comprising: a liquid crystal display panel, and the aforementioned backlight module disposed on the backside of the liquid crystal display panel.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

In an embodiment of the invention, backlight modules are provided for solving aforementioned problems. According to another embodiment of the invention, an optical element is provided to polarize or integrate light, and even brightness.

Further, embodiments of the invention provide a liquid crystal display and a backlight module, employing the optical element, with enhanced, uniform, and diffused brightness and increased optical efficiency. Therefore, the liquid crystal displays of the invention meet the requirements of low cost, high efficiency, light weight, and thinness for flat panel displays.

Figure 3:
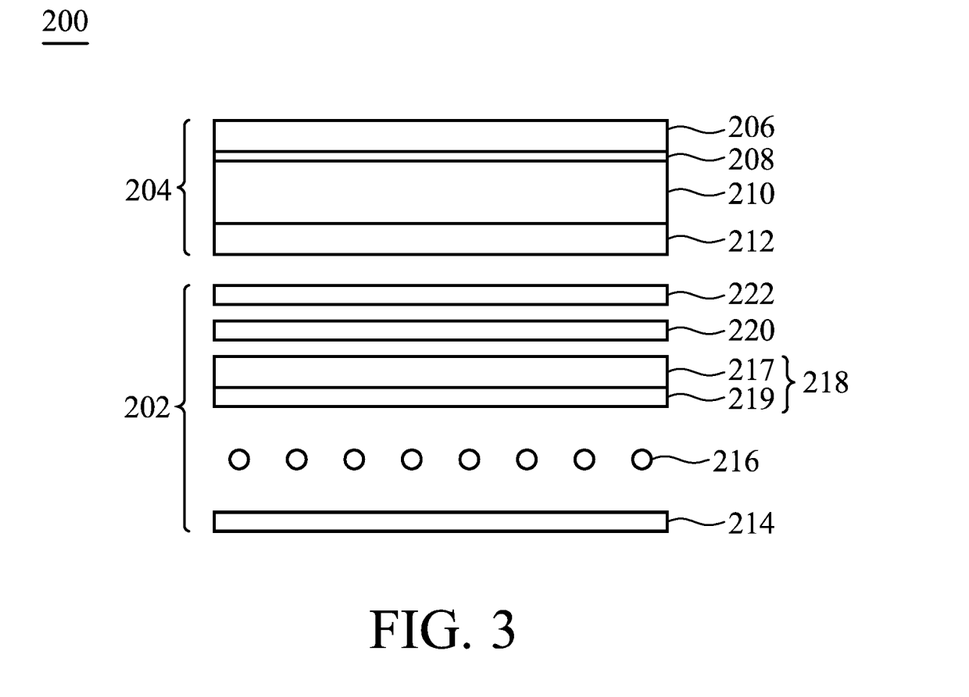
FIG. 3 shows a cross-section view of a backlight module employed in the liquid crystal display according to an embodiment of the invention.

FIG. 3 shows a liquid crystal display 200 employing a high efficient backlight module 202 according to an embodiment of the invention. The liquid crystal display 200 includes a backlight module 202 and a liquid crystal display panel 204. The liquid crystal display panel 204 can include a top substrate 206, color filter 208, liquid crystal layer 210, and a bottom substrate 212. The backlight module 204 includes a reflector 214, a light source 216, a brightness enhancement diffusion complex film 218, a retardation film 220, and a polarizing sheet 222. Particularly, the brightness enhancement diffusion complex film 218 can be an optical element which includes a diffusion sheet and a cholesteric liquid crystal film. The brightness enhancement diffusion complex film 218 includes a cholesteric liquid crystal film 217, and a transparent optical film 219 disposed on the cholesteric liquid crystal film 217.

It should be noted that the whole transparent optical film 219 and the whole cholesteric liquid crystal film 217 directly adhered to each other, and there is nothing located between the transparent optical film 219 and the cholesteric liquid crystal film 217. Further, the transparent optical film 219 is located between the cholesteric liquid crystal film 217 and the light source 216. The transparent optical film 219 can include a transparent particle with a weight percentage of 5-40 wt %; and a resin with a weight percentage of 60-95 wt %, based on the weight of the transparent optical film 219. In an embodiment of the invention, the transparent optical film 219 can include a transparent particle with a weight percentage of 20-40 wt %; and a resin with a weight percentage of 60-80 wt %, based on the weight of the transparent optical film 219. Further, the transparent optical film 219 can include a transparent particle with a weight percentage of 25-30 wt %; and a resin with a weight percentage of 70-75 wt %, based on the weight of the transparent optical film 219.

Figure 4A:
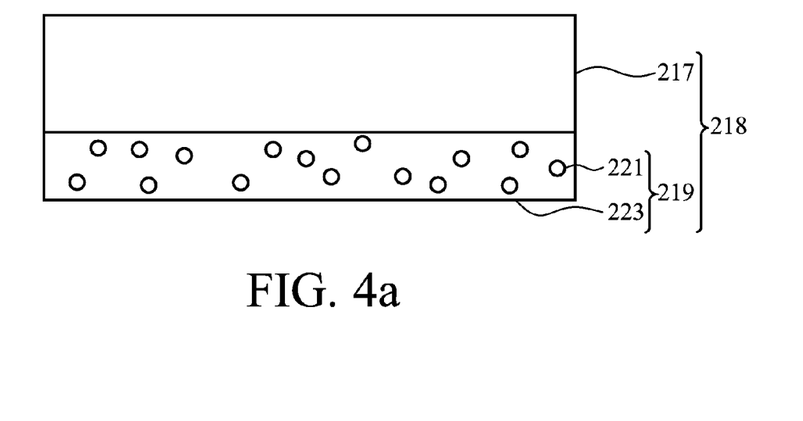
FIG. 4a shows a schematic diagram of the brightness enhancement diffusion complex film according to an embodiment of the invention.

FIG. 4a is a schematic diagram of the brightness enhancement diffusion complex film 218. The method for forming the brightness enhancement diffusion complex film 218 includes coating a resin composition, having transparent particles 221 uniformly distributed therein, on the cholesteric liquid crystal film 217, and irradiating the coating with an energy (such as a radiation or a thermal treatment) to form a transparent optical film 219. The method for coating the resin composition on the cholesteric liquid crystal film 217 includes a spin coating, a dip coating, a roll coating, or a blade coating method.

The transparent particle 221 includes silica gel, organic polymer, glass, or transparent conductive material, such as polystyrene (PS), or poly(methyl methacrylate) (PMMA) transparent particles, and can be hollow or solid. Further, the transparent particle can be ball-shaped, ellipsoidal, polygonal, or combinations thereof. The transparent particle can have a particular size of between 5-30 µm. The resin can include a network polymer, thermosetting resin polymer, or photosensitive resin polymer, such as ACU-TITE UV298 (sold and manufactured by Chem-mat technologies, inc.), NOA6 (sold and manufactured by Norland Products inc.), or NOA81 (sold and manufactured by Norland Products inc.). The transparent optical film 219 can have a thickness of between 20-1000 µm, preferably 30-300 µm.

Figure 4B:
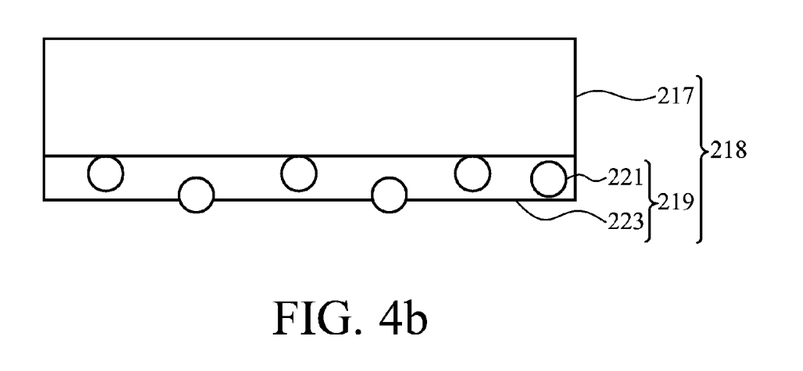
FIG. 4b shows a schematic diagram of the brightness enhancement diffusion complex film according to another embodiment of the invention.

According to another embodiment of the invention, the transparent particle can protrude from the surface 233 of the transparent optical film 219, referring to FIG. 4b. The light source can include cool cathode fluorescent lamp (CCFL), hot cathode fluorescent lamp (HCFL), or light emitting diode (LED), and can be side-lighting or bottom-lighting.

When the light source irradiates a light into the brightness enhancement diffusion complex film, the light is frequently refracted, reflected, and scattered when passing through the two layers (the cholesteric liquid crystal film and a transparent optical film) with distinct reflective indexes, resulting in an optical diffusion effect. Therefore, the brightness uniformity of the backlight module is improved.

According to Mie scattering theory, particles (with a suitable size) distributed among an optical film can reduce the occurrence of the backscattering and integrate the emitting light in an envisaging angle. The integrated emitting light sequentially enters the liquid crystal layer and is divided into a left-circular polarized light and a right-circular polarized light by the cholesteric liquid crystal. The circular polarized light in the direction opposite to the spiral direction of the cholesteric liquid crystal is transmitted and whilst the circular polarized light of the same direction as the spiral direction is selectively reflected. The reflected circular polarized light can be converted by the reflected mechanism of the light source and be transmitted to the cholesteric liquid crystal film. The transmitted circular polarized light is converted by the reflector into linear polarized light. Accordingly, the brightness enhancement diffusion complex film of the invention can simultaneously achieve the requirements of light polarization, light integration, and brightness uniformity.

The following examples are intended to illustrate the invention more fully without limiting the scope, since numerous modifications and variations will be apparent to those skilled in this art.

EXAMPLE 1

Figure 5A:
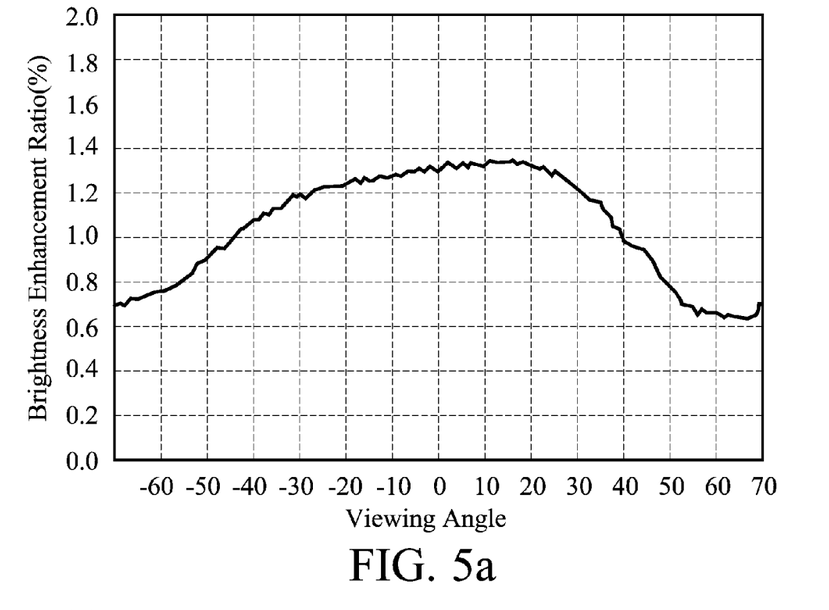
FIG. 5a shows a graph plotting the brightness enhancement ratio against the viewing angle as disclosed in the backlight module of Example 1.
Figure 5B:
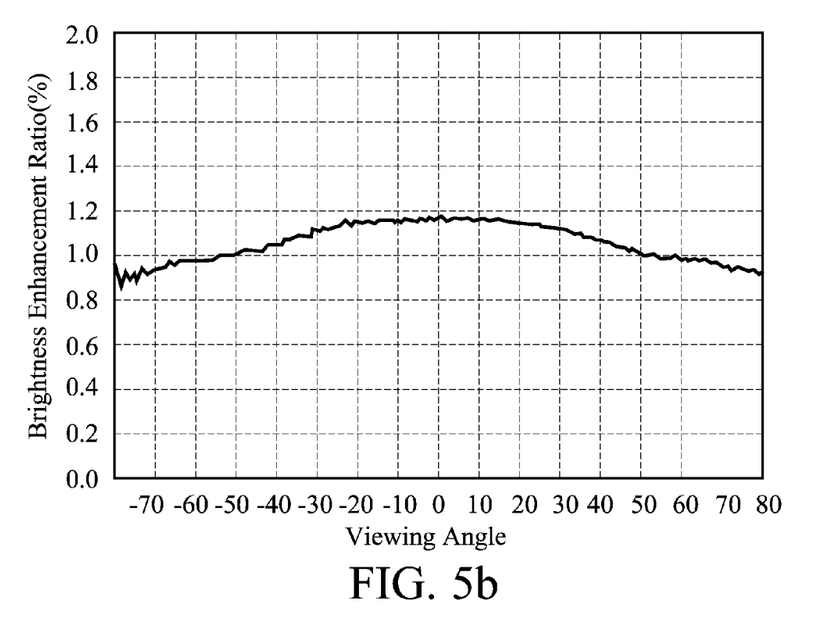
FIG. 5b shows a graph plotting the brightness enhancement ratio against the viewing angle as disclosed in the backlight module shown in FIG. 2.
Figure 5C:
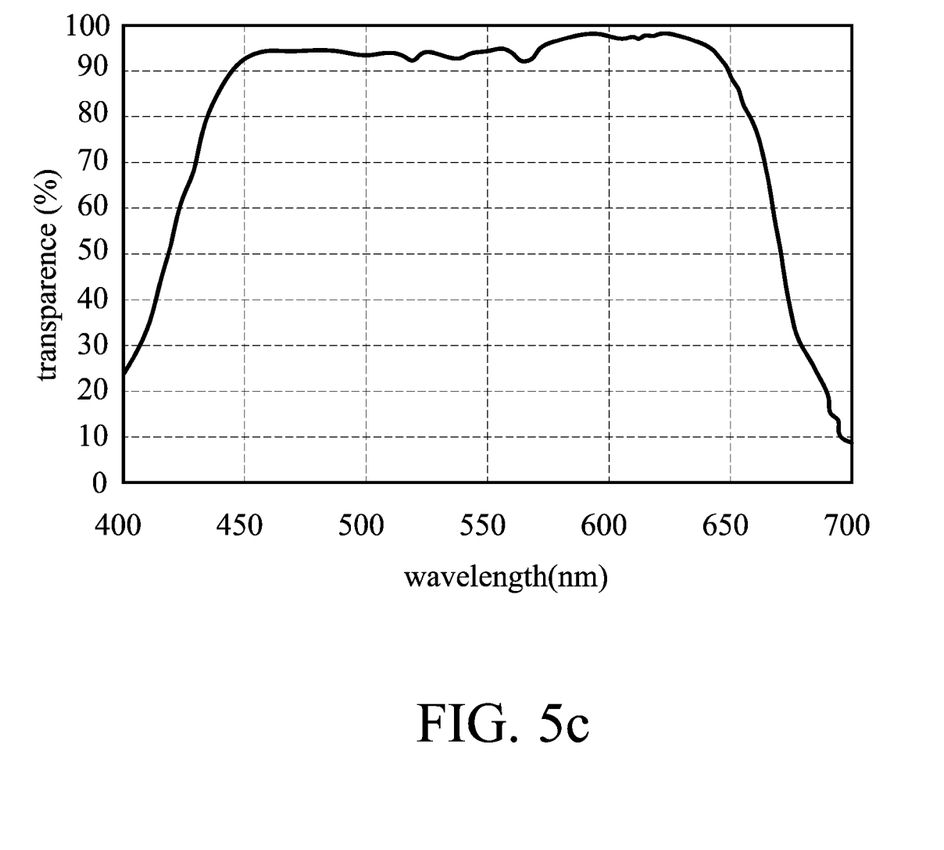
FIG. 5c shows a graph plotting the transparence against the wavelength as disclosed in the brightness enhancement diffusion complex film of Example 1.

A transparent particle (silic gel with a particular size of 5-25 µm, sold and manufactured by Merck) was mixed with a photosensitive resin polymer (sold and manufactured by Chem-mat technologies, inc.), preparing a composition. The transparent particle had a weight percentage of 30 wt %, based on the weight of the photosensitive resin polymer. Next, the composition was coated on a cholesteric liquid crystal film by blade coating. After UV-curing at room temperature, a transparent optical film was obtained, thus completing the fabrication of the brightness enhancement diffusion complex film. The transparent optical film had a thickness of 210 µm. The polarization degree and haze of the brightness enhancement diffusion complex film were measured by a spectrometer (Lambda 900, PerkinElmer) and an integrating sphere system. The polarization degree result is shown in FIG. 5c. The haze of the brightness enhancement diffusion complex film was 96.899% with a measured wavelength of 500 nm. The diffusivity brightness enhancement diffusion complex film was 46.42%, measured by a gonio-photometer (GC5000L, sold by NIPPON DENSHOKU).

The optical element (brightness enhancement diffusion complex film) was combined with a light source and a reflector according to the structures disclosed in FIG. 1. FIG. 5a is a graph plotting the brightness enhancement ratio against the viewing angle as disclosed in the backlight module shown in FIG. 3 (based on the brightness of the backlight module shown in FIG. 1). Further, FIG. 5b is a graph plotting the brightness enhancement ratio against the viewing angle as disclosed in the backlight module shown in FIG. 2 (based on the brightness of the backlight module shown in FIG. 1). The results are shown in Table 1.

TABLE 1

| | backlight module as shown in FIG. 1 | backlight module as shown in FIG. 2 | backlight module of the invention (as shown in FIG. 3) |
|---|---|---|---|
| structure | Bottom-emitting light source & Bottom diffusion sheet & polarizing sheet | Bottom-emitting light source & Bottom diffusion sheet & brightness enhancement film & polarizing sheet | Bottom-emitting light source & brightness enhancement diffusion complex film & polarizing sheet |
| brightness | 1459 cd/m$^2$ | 1726 cd/m$^2$ | 1975 cd/m$^2$ |
| brightness enhancement ratio | 1 | 1.183 | 1.354 |

As shown in FIGS. 5a and 5b and Table 1, the backlight module of the invention had improved brightness enhancement ratio.

EXAMPLE 2

A transparent particle (polystyrene grain with a particular size of about 6 μm) was mixed with a photosensitive resin polymer (sold and manufactured by Chem-mat technologies, inc.), preparing a composition. The transparent particle had a weight percentage of 30 wt %, based on the weight of the photosensitive resin polymer. Next, the composition was coated on a cholesteric liquid crystal film (an acrylic thermotropic cholestric liquid crystal film with a thickness of 150 μm, prepared from liquid crystal No. HELISOL manufactured and sold by Wacker). After UV-curing at room temperature, a transparent optical film was obtained, thus completing the fabrication of the brightness enhancement diffusion complex film. The transparent optical film had a thickness of 230 μm. The polarization degree and haze of the brightness enhancement diffusion complex film were measured by a spectrometer (Lambda 900, PerkinElmer) and an integrating sphere system. The haze of the brightness enhancement diffusion complex film was 97% with a measured wavelength of 500 nm. The diffusivity brightness enhancement diffusion complex film was 41%, measured by a gonio-photometer (GC5000L, sold by NIPPON DENSHOKU).

Figure 6A:
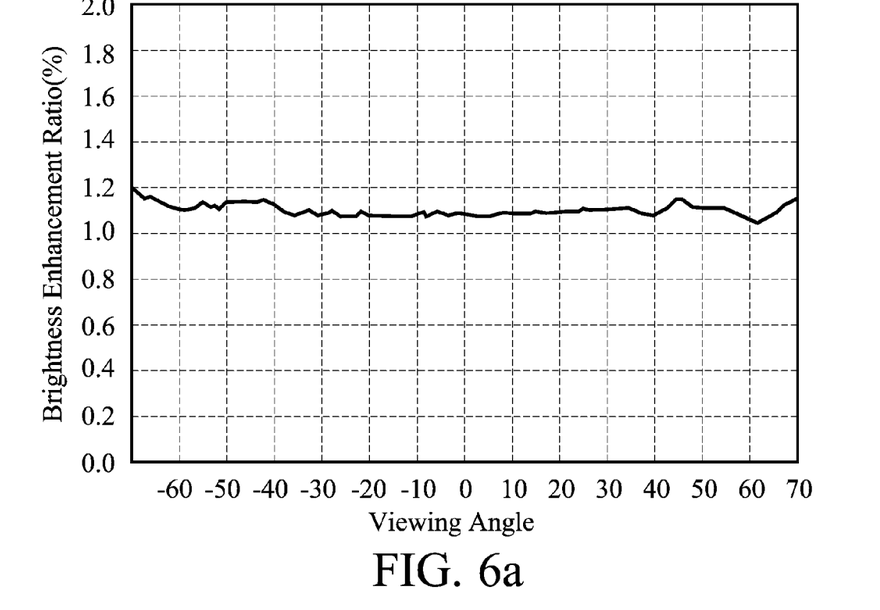
FIG. 6a shows a graph plotting the brightness enhancement ratio against the viewing angle as disclosed in the backlight module of Example 2.
Figure 6B:
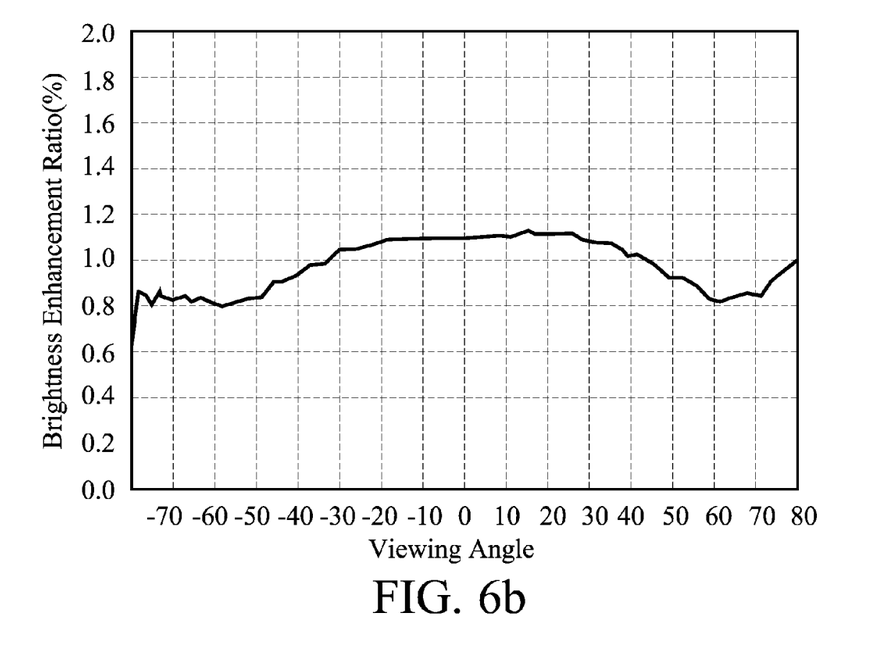
FIG. 6b shows a graph plotting the brightness enhancement ratio against the viewing angle as disclosed in the backlight module shown in FIG. 2.

The optical element (brightness enhancement diffusion complex film) was combined with a light source and a reflector according to the structures disclosed in FIG. 1. FIG. 6a is a graph plotting the brightness enhancement ratio against the viewing angle as disclosed in the backlight module shown in FIG. 3 (based on the brightness of the backlight module shown in FIG. 1). Further, FIG. 6b is a graph plotting the brightness enhancement ratio against the viewing angle as disclosed in the backlight module shown in FIG. 2 (based on the brightness of the backlight module shown in FIG. 1). The results are shown in Table 2.

TABLE 2

| | backlight module as shown in FIG. 1 | backlight module as shown in FIG. 2 | backlight module of the invention (as shown in FIG. 3) |
|---|---|---|---|
| structure | Bottom-emitting light source & Bottom diffusion sheet & polarizing sheet | Bottom-emitting light source & Bottom diffusion sheet & brightness enhancement film & polarizing sheet | Bottom-emitting light source & brightness enhancement diffusion complex film & polarizing sheet |
| brightness | 1457 cd/m$^2$ | 1661 cd/m$^2$ | 1754 cd/m$^2$ |
| brightness enhancement ratio | 1 | 1.14 | 1.204 |

As shown in FIGS. 6a and 6b and Table 2, the backlight module of the invention had improved brightness enhancement ratio.

Accordingly, the brightness enhancement diffusion complex film provided by the invention can simultaneously achieve the requirements of light polarization, light integration, and brightness uniformity. The brightness enhancement diffusion complex film can replace the combined brightness enhancement film, diffusion sheet, and prism sheet in conventional optical elements, resulting in a multifunctional optical element. Therefore, the backlight module and liquid crystal display employing the brightness enhancement diffusion complex film have improved thinness.

Since the transparent optical film of the brightness enhancement diffusion complex film has a plurality of transparent particles uniformly distributed therein, the backlight module of the invention can simultaneously achieve the requirements of light polarization, light integration, and brightness uniformity, in absence of the brightness enhancement film and bottom diffusion sheet. Further, the transparent optical film can prevent the cholesteric liquid crystal film from damage by shaving during assembly. Moreover, the volume and weight of the liquid crystal display employing the brightness enhancement diffusion complex film can be improved, thereby enhancing performance thereof.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A backlight module, comprising:
   a light source;
   a brightness enhancement diffusion complex film consisting of a cholesteric liquid crystal film and a single transparent optical film, wherein the whole transparent optical film and the whole cholesteric liquid crystal film are directly adhered to each other, in the absence of an intermediate layer located therebetween, and wherein the transparent optical film is disposed between the cholesteric liquid crystal film and the light source; and
   a polarizing sheet disposed on the brightness enhancement diffusion complex film, wherein the transparent optical film comprises:
a transparent particle with a weight percentage of 5-40 wt %; and
a resin with a weight percentage of 60-95 wt %, based on the weight of the transparent optical film.

2. The backlight module as claimed in claim 1, further comprising a retardation sheet disposed between the polarizing sheet and the brightness enhancement diffusion complex film.

3. The backlight module as claimed in claim 1, wherein the light source comprises a cool cathode fluorescent lamp (CCFL), or a hot cathode fluorescent lamp (HCFL).

4. The backlight module as claimed in claim 1, wherein the light source is side-lighting or bottom-lighting.

5. A liquid crystal display, comprising:
a liquid crystal display panel; and
a backlight module, disposed on the backside of the liquid crystal display panel, wherein the backlight module comprises:
a light source;
a brightness enhancement diffusion complex film consisting of a cholesteric liquid crystal film and a transparent optical film, wherein the whole transparent optical film and the whole cholesteric liquid crystal film are directly adhered to each other, in the absence of an intermediate layer located therebetween, and wherein the transparent optical film is disposed between the cholesteric liquid crystal film and the light source; and
a polarizing sheet disposed on the brightness enhancement diffusion complex film,
wherein the transparent optical film comprises:
a transparent particle with a weight percentage of 5-40 wt %; and
a resin with a weight percentage of 60-95 wt %, based on the weight of the transparent optical film.

6. A backlight module, comprising:
a light source;
a brightness enhancement diffusion complex film consisting of a cholesteric liquid crystal film and a transparent optical film, wherein the whole transparent optical film and the whole cholesteric liquid crystal film are directly adhered to each other, in the absence of an intermediate layer located therebetween, and wherein the transparent optical film is disposed between the cholesteric liquid crystal film and the light source;
a retardation sheet directly disposed on the cholesteric liquid crystal film; and
a polarizing sheet directly disposed on the retardation sheet,
wherein the transparent optical film comprises:
a transparent particle with a weight percentage of 5-40 wt %; and
a resin with a weight percentage of 60-95 wt %, based on the weight of the transparent optical film.

* * * * *